(12) United States Patent
Yang et al.

(10) Patent No.: US 9,267,584 B2
(45) Date of Patent: Feb. 23, 2016

(54) STACKING MACHINE

(71) Applicant: Shenzhen China Star Optoelectronics Technology Co., Ltd., Shenzhen, Guangdong (CN)

(72) Inventors: Guokun Yang, Guangdong (CN); Zhiyou Shu, Guangdong (CN); Chun hao Wu, Guangdong (CN); Kun hsien Lin, Guangdong (CN); Minghu Qi, Guangdong (CN); Zhenhua Guo, Guangdong (CN); Yongqiang Wang, Guangdong (CN); Zenghong Chen, Guangdong (CN); Chenyangzi Li, Guangdong (CN); Weibing Yang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 301 days.

(21) Appl. No.: 13/703,036

(22) PCT Filed: Nov. 16, 2012

(86) PCT No.: PCT/CN2012/084768
§ 371 (c)(1),
(2) Date: Dec. 10, 2012

(87) PCT Pub. No.: WO2014/059722
PCT Pub. Date: Apr. 24, 2014

(65) Prior Publication Data
US 2014/0123784 A1    May 8, 2014

(30) Foreign Application Priority Data

Oct. 17, 2012  (CN) .......................... 2012 1 0395119

(51) Int. Cl.
*F16H 19/06*    (2006.01)
*F16H 37/00*    (2006.01)

(52) U.S. Cl.
CPC ........ *F16H 19/06* (2013.01); *F16H 2019/0686* (2013.01); *Y10T 74/18152* (2015.01)

(58) Field of Classification Search
CPC ............ F16H 19/06; F16H 2019/0613; F16H 2019/0686
USPC ................. 74/37, 89.2, 89.21, 89.22, 490.09; 414/749.1, 749.6; 474/84
See application file for complete search history.

(56) References Cited

U.S. PATENT DOCUMENTS

| | | | | |
|---|---|---|---|---|
| 4,566,346 A | * | 1/1986 | Petiteau | 74/89.22 |
| 4,753,119 A | * | 6/1988 | Kuspert | 74/89.21 |
| 4,865,516 A | * | 9/1989 | Focke et al. | 414/792.8 |
| 5,027,666 A | * | 7/1991 | Filicetti | 74/37 |
| 5,690,567 A | * | 11/1997 | DeNijs et al. | 474/73 |

(Continued)

*Primary Examiner* — William Kelleher
*Assistant Examiner* — Jane Cook

(57) ABSTRACT

A stacking machine is provided, which comprises a body and a translational mechanism for driving the body to make a translational motion. The synchronous belt used in the translational mechanism can effectively resolve the problem of slipping caused by wheel rolling, and thus enables the movement of the stacking machine to be more accurate, with the highest speed of the movement also increased significantly. Besides that, the synchronous belt mechanism is more accurate in positioning, which reduces the number of times of repeated adjustments and maintenance caused by bigger positioning errors.

6 Claims, 1 Drawing Sheet

(56) References Cited

U.S. PATENT DOCUMENTS

| | | | |
|---|---|---|---|
| 5,819,584 A * | 10/1998 | Evans | 74/89.21 |
| 5,901,607 A * | 5/1999 | Kimura | 74/89.22 |
| 6,223,611 B1 * | 5/2001 | Kelley | 74/89.21 |
| 2009/0301237 A1 * | 12/2009 | Everman | 74/37 |
| 2011/0009219 A1 * | 1/2011 | Dierl | 474/101 |

* cited by examiner

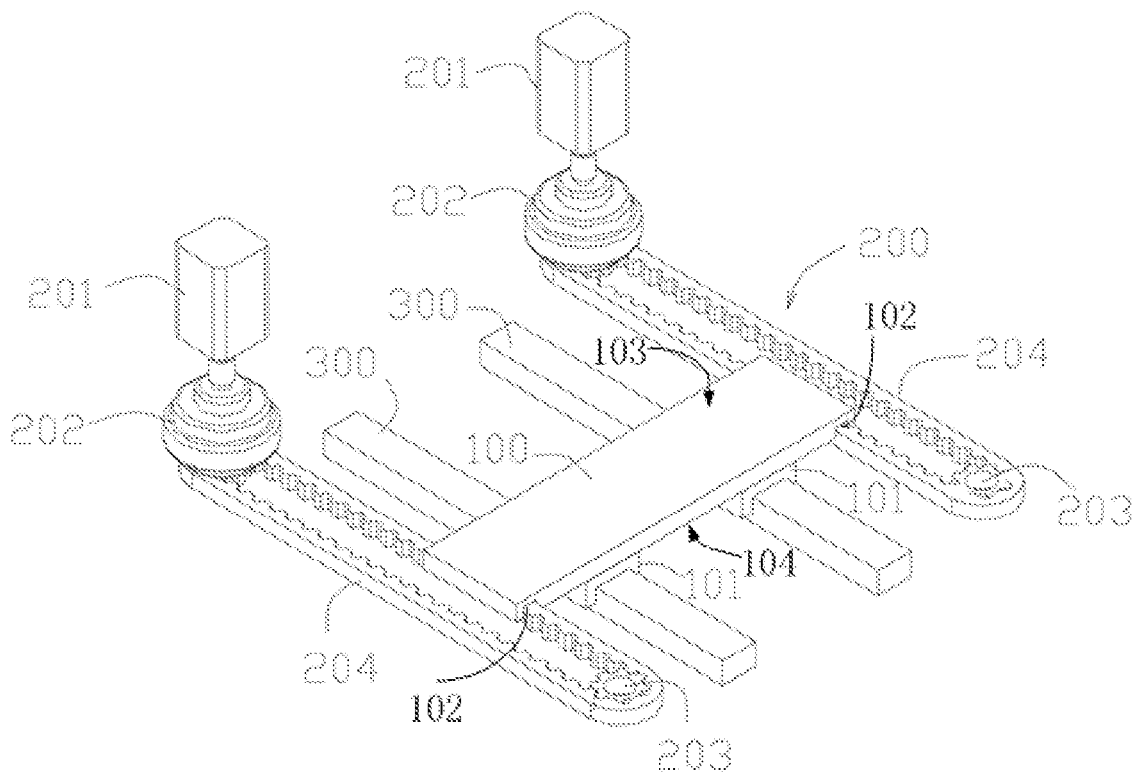

STACKING MACHINE

FIELD OF THE INVENTION

The present invention relates to a device for transporting cartridges in the automatic warehouse system, and more particularly to a stacking machine.

BACKGROUND OF THE INVENTION

In the automatic warehouse system, a stacking machine transports the cartridge inside the automatic warehouse system. The stacking machine is used for transporting the cartridge from the upstream transportation system to the warehouse system, transporting the cartridge to a temporary position at a plurality of processing machines, transporting the loaded cartridge back to the warehouse system, transporting the cartridge to the temporary position in the downstream transportation system, etc. Thus, the stacking machine needs to complete many actions and travel a long route, sometimes over 150 m.

Currently, aiming at the problem of long route and low speed of the stacking machine, the most primitive method is adopted, i.e. two stacking machines are arranged in the automatic warehouse system, which alleviates the contradiction between the transportation speed and the production efficiency to some extent. However, the following problems still exists: the cost is increased by two stacking machines; the two stacking machines have different routes and need handover.

However, in a warehouse system with only one stacking machine, with the limited space and route, the improvement in the transportation speed of the stacking machine and the production efficiency is limited, and the following defects still exists:

1. The power supply system of the stacking machine has high costs, and the power source of the motion mechanism for moving the stacking machine is a four-wheel drive servomotor on the stacking machine;

2. the stacking machine is moved by rolling of the wheel on the guide rail, and thus inclined to slip, especially when running at a high speed or when performing a common actuation and brake, which makes the motion positioning not accurate and limits the increase in speed;

3. because the stacking machine is moved by rolling of the wheel on the guide rail and thus inclined to slip, an acceleration and deceleration control method is used as the motion control method, which increases the motion time but is not significant in increasing the speed; and 4. when moved by rolling of the wheel on the guide rail, because the location at the connection of one guide rail with another guide rail is not smooth, the wheel is inclined to be damaged, with the addition of the normal abrasion of the wheel, making the motion not accurate.

SUMMARY OF THE INVENTION

Aiming at the above defects in the prior art, the technical problem to be solved by the present invention is to provide a stacking machine.

The present invention adopts the following technical solution to solve its technical problem: a stacking machine is provided, comprising a base, a body movably arranged on the base, and a translational mechanism for driving the body to make a translational motion on the base.

The stacking machine of the present invention, wherein the translational mechanism includes a synchronous belt mechanism or a belt drive mechanism respectively arranged at both sides of the base.

The stacking machine of the present invention, wherein the translational mechanism is a synchronous belt mechanism, which includes a driving wheel, a driven wheel, a synchronous belt successively wound around the driving wheel and the driven wheel, and a drive device for driving the driving wheel to rotate; the body is connected at both sides to the synchronous belt respectively.

The stacking machine of the present invention, wherein the drive device includes a servomotor.

The stacking machine of the present invention, wherein the driving wheel is a planetary reducer arranged at an end of a shaft of the servomotor via a coupling.

The stacking machine of the present invention, wherein the synchronous belt includes a synchronous belt made of a steel cord core belt.

The stacking machine of the present invention, wherein the translational mechanism is a belt drive mechanism, which includes a driving wheel, a driven wheel, a belt successively wound around the driving wheel and the driven wheel, and a drive device for driving the driving wheel to rotate.

The stacking machine of the present invention, wherein the base is provided with two parallel spaced linear guide rails, and the body is provided at a position on its bottom corresponding to the two linear guide rails with a sliding block, the body being movably arranged on the base by fitting of the sliding block for the linear guide rail.

The stacking machine of the present invention has the following beneficial effects: the translational mechanism used in the present invention can effectively resolve the problem of slipping caused by wheel rolling, and thus enables the movement of the stacking machine to be more accurate, with the highest speed of the movement also increased significantly. Besides that, the synchronous belt mechanism is more accurate in positioning, which reduces the number of times of repeated adjustments and maintenance caused by bigger positioning errors.

BRIEF DESCRIPTIONS OF THE DRAWINGS

The present invention will further be explained with reference to drawings and examples. In the drawing:

FIG. 1 is a schematic structure drawing of the preferred example of a stacking machine of the present invention.

DETAILED DESCRIPTION OF THE EMBODIMENTS

As shown in FIG. 1, in the preferred example of the present invention, the stacking machine includes a base (not shown in the drawing with a reference number), a body 100 movably arranged on the base, and a translational mechanism 200 used for driving the body 100 to make a translational motion on the base. Wherein, the body 100 is used for stacking and transporting cartridges or goods which are placed on a top surface 103 of the body 100, and the translational mechanism 200 drives the body 100 to make translational motion on the base, so as to transport goods or cartridges to the established station. Further, the translational mechanism includes a synchronous belt mechanism or a belt drive mechanism arranged at both sides of the base respectively. The synchronous belt can effectively resolve the problem of slipping caused by wheel rolling, and thus enables the movement of the stacking machine to be more accurate, with the highest speed of the movement also increased significantly. Besides that, the synchronous belt mechanism is more accurate in positioning, which reduces the number of times of repeated adjustments and maintenance caused by bigger positioning errors, with the time for actuating and braking shorter.

Preferably, in the preferred example of the present invention, a synchronous belt mechanism is used in the translational mechanism, including a driving wheel, a driven wheel 203, a synchronous belt 204 successively wound around the driving wheel and the driven wheel 203, and a drive device 201 used for driving the driving wheel to rotate; the body 100 is connected at both sides to the synchronous belt 204 respectively. Specifically, two driven wheels 203 are independent from each other. Two rotation shafts of the two driven wheels 203 are separated from and unconnected to each other, and the two rotation shafts are perpendicular to a planar surface defined by a top surface 103 of the body 100. Two grooves 102 are defined on a bottom surface 104 of the body 100, the bottom surface 104 is opposite to the top surface 103, and the two grooves 102 are respectively located at the both sides of the body 100 to fit the synchronous belts 204, so that the body 100 is arranged on the synchronous belts 204 and is detachably fixed at both sides to two synchronous belts 204 respectively. When the drive device 201 drives the driving wheel to rotate, the driven wheel 203 rotates with it, and synchronous belt 204 rotates around the driving wheel and the driven wheel 203; because the body 100 is fixedly connected at both sides to the synchronous belt 204 respectively, it can make a translational motion with rotation of the synchronous belt 204.

Preferably, the drive device 201 is a servomotor; because the servomotor is relatively fixed, it can be supplied with power through a wired power supply, which can reduce the cost. The driving wheel is a planetary reducer 202 in the preferred example of the present invention that is arranged at the end of the shaft of the servomotor via a coupling. Compared with other reducers, the planetary reducer has such features as high rigidity, high accuracy, high drive efficiency, high torque/volume ratio, and life-long maintenance-free. Because of these features, the planetary reducer is installed on the servomotor, which can reduce the rotational speed, improve the torque, and match inertia. Besides, the synchronous belt 204 in this example is a synchronous belt made of a steel cord core belt, which has such advantages as high tensile strength, good impact resistance, long lifetime, small elongation, and good flex resistance, especially suitable for long distance, heavy shipping, high speed transportation of materials.

Besides, in addition to the synchronous belt mechanism, a belt drive mechanism can also be used, usually including a driving wheel, a driven wheel, a belt successively wound around the driving wheel and the driven wheel, and a drive device used for driving the driving wheel to rotate; likewise, the drive device can also be a servomotor, which can further be provided at the end of the shaft with a suitable deceleration device, so as to meet the requirement of the moving speed of the body.

In each of the above preferred examples, the base is provided with two parallel spaced linear guide rails 300, and the body 100 is provided at a position on its bottom corresponding to the two linear guide rails 300 with a sliding block 101, the body 100 being movably arranged on the base by fitting of the sliding block 101 for the linear guide rail 300. Using the linear guide rail 300 enables the stacking machine to move more steady and smooth, extends lifetime of the mechanism, and makes the movement more accurate.

The above examples are used only for explaining the technical concept and features of the present invention. They are provided to make those skilled in the art understand the present invention and implement it, and cannot thereby limit the extent of protection of the present invention. Any equivalent alteration and modification within the scope of the claims of the present invention shall fall within the scope of the claims of the present invention.

What is claimed is:

1. A stacking machine, comprising a body and a translational mechanism for driving the body to make a translational motion;
    wherein the translational mechanism consists of two synchronous belt mechanisms respectively arranged at both sides of the body; each of the synchronous belt mechanisms includes a driving wheel, a driven wheel, a synchronous belt successively wound around the driving wheel and the driven wheel, and a drive device for driving the driving wheel to rotate; two driven wheels are independent from each other; two rotation shafts of the two driven wheels are separated from and unconnected to each other, the two rotation shafts are perpendicular to a planar surface defined by a top surface of the body; two grooves are defined on a bottom surface of the body, the bottom surface is opposite to the top surface, and the two grooves are respectively located at the both sides of the body to fit the synchronous belts, so that the body is arranged on the synchronous belts and is detachably fixed at both sides to two synchronous belts respectively, which makes the translational motion of the body with the rotation of the synchronous belts.

2. The stacking machine according to claim 1, wherein the drive device includes a servomotor.

3. The stacking machine according to claim 1, wherein each of the synchronous belts is a steel cord conveyor belt.

4. The stacking machine according to claim 1, wherein the stacking machine further comprises two parallel spaced linear guide rails, and two sliding blocks are arranged on a bottom of the body corresponding to the two parallel spaced linear guide rails, thus the body is movably arranged on the two parallel spaced linear guide rails by fitting the two sliding blocks to the two parallel spaced linear guide rails respectively.

5. The stacking machine according to claim 2, wherein the stacking machine further comprises two parallel spaced linear guide rails, and two sliding blocks are arranged on a bottom of the body corresponding to the two parallel spaced linear guide rails, thus the body is movably arranged on the two parallel spaced linear guide rails by fitting the two sliding blocks to the two parallel spaced linear guide rails respectively.

6. The stacking machine according to claim 3, wherein the stacking machine further comprises two parallel spaced linear guide rails, and two sliding blocks are arranged on a bottom of the body corresponding to the two parallel spaced linear guide rails, thus the body is movably arranged on the two parallel spaced linear guide rails by fitting the two sliding blocks to the two parallel spaced linear guide rails respectively.

* * * * *